Aug. 10, 1965 C. W. HATCHER Re. 25,838
CONCRETE BUMP CUTTER
Original Filed Oct. 15, 1956 3 Sheets-Sheet 1
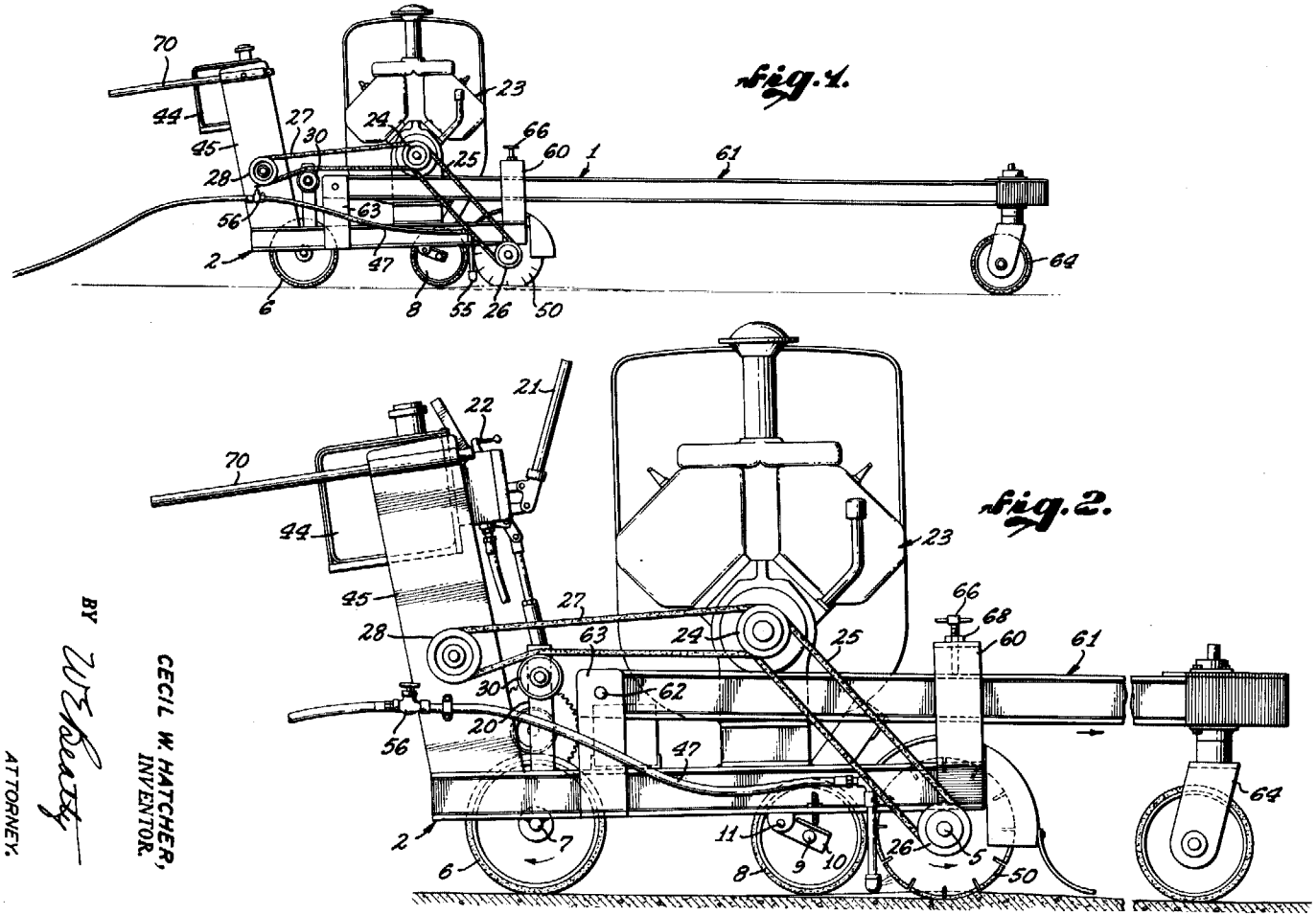
CECIL W. HATCHER,
INVENTOR.
BY W E Beatty
ATTORNEY.

CONCRETE BUMP CUTTER
Original Filed Oct. 15, 1956 3 Sheets-Sheet 2
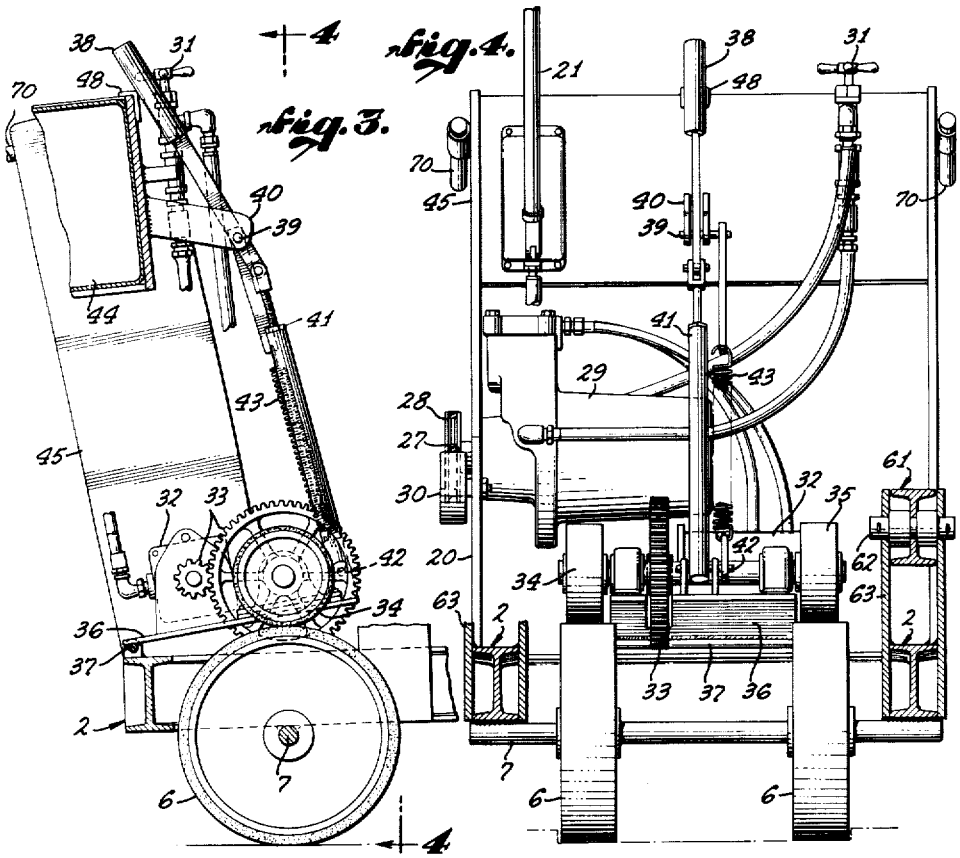
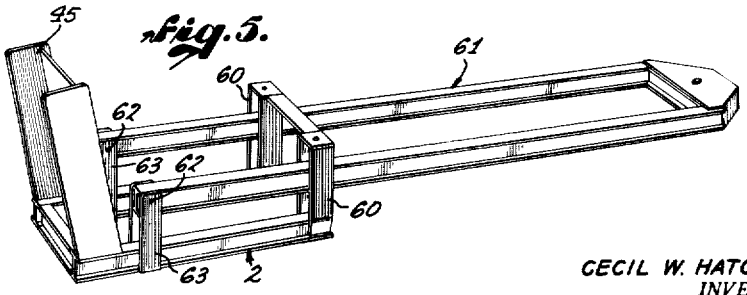
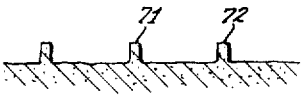
CECIL W. HATCHER,
INVENTOR.
BY W. E. Beatty
ATTORNEY.

CONCRETE BUMP CUTTER

Original Filed Oct. 15, 1956 3 Sheets-Sheet 3

CECIL W. HATCHER,
INVENTOR.

BY W. E. Beatty

ATTORNEY.

United States Patent Office

Re. 25,838
Reissued Aug. 10, 1965

25,838
CONCRETE BUMP CUTTER

Cecil W. Hatcher, West Covina, Calif., assignor, by mesne assignments, to Concut, Inc., a corporation of California Original No. 3,007,687, dated Nov. 7, 1961, Ser. No. 615,937, Oct. 15, 1956. Application for reissue Nov. 4, 1963, Ser. No. 321,699
13 Claims. (Cl. 299—39)

Matter enclosed in heavy brackets [ ] appears in the original patent but forms no part of this reissue specification; matter printed in italics indicates the additions made by reissue.

The invention relates to a concrete bump cutter and more particularly to a self-propelled vehicle having rotatable abrasive wheels for removing bumps from concrete paving such as aircraft landing fields, floors and the like.

In one particular case, a section of concrete air field paving was finished by running a machine on an adjoining strip which had bumps or ridges about 20 inches wide and about ⅛ inch high, these ridges occurring transversely of the length of the strip every 20 feet of its length. The concrete strip then had corresponding ridges or bumps. It has been found that these bumps in the concrete strip cause damage to the instruments on airplanes landing or taking off at high speed on this concrete landing field. To save the expense of removing this concrete which is 12 to 14 inches thick, and doing the job over, the present invention makes it possible to remove these bumps, while maintaining the elliptical crown of the paving.

Another object of the invention is to cut the bumps on a pavement and thereby provide anti-skid grooves in the pavement. The purpose of this is to avoid leaving a smooth surface and approximate the existing rough finish originally produced by dragging a rough burlap sack along the surface of the paving during its construction This is accomplished by performing the cutting with cutters having cutting segments spaced apart to produce ridges. It has been found that the abrasive action of the cutters levels the ridges to a height of 1/32 to 1/16 inch when the space between adjacent cutting segments is of the order of .020 to .025 inch. By varying or suitably selecting this spacing, ridges of a desired height and grooves of a desired width can be obtained, the tops of such ridges being substantially level with the paving.

An object of the invention is to level the paving and thereby provide a level path for the machine which does the levelling.

A further object of the invention is to reduce the sensitivity of the machine to relatively minor irregularities of the surface of the paving. This is accomplished by supporting the cutter, for height adjustment, on an elongated frame having a wheel support at a longer distance from the cutter than its vehicle support, whereby the variation in the height of the cutter is only a fraction of the variation in the height of the outer end of such elongated frame as its caster wheel rides over the paving.

Another object is to provide the above mentioned elongated frame for detachment from the vehicle frame where the machine is to be employed in a restricted space such as for leveling the floor of a building.

For further details of the invention reference may be made to the drawings wherein FIG. 1 is a side view in elevation of a concrete bump cutter according to the present invention with the outrigger frame attached.

FIG. 2 is an enlarged view like FIG. 1, with parts broken away.

FIG. 3 is an enlarged view in vertical elevation, partly in section and with parts broken away, showing the hydraulic motor drive for the cutters.

FIG. 4 is a section on line 4—4 of FIG. 3 looking in the direction of the arrows.

FIG. 5 is a perspective view of the carriage frame and its extension frame.

FIG. 11 is a sectional view of paving cut with the bump cutter of the present invention.

Figure 6:
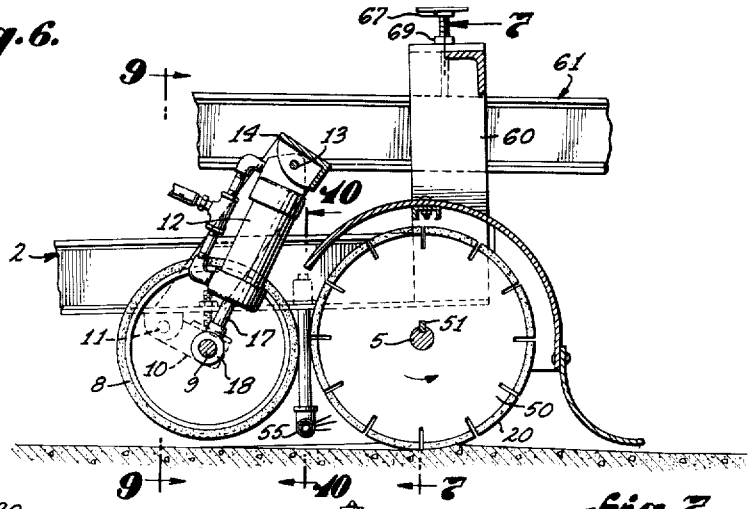
FIG. 6 is an enlarged view in side elevation partly in section and with parts broken away showing the hydraulic lift for the vehicle wheels to adjust the height of the cutter, as well as the stop which limits the downward movement of the cutter when the extension frame is used.
Figure 9:
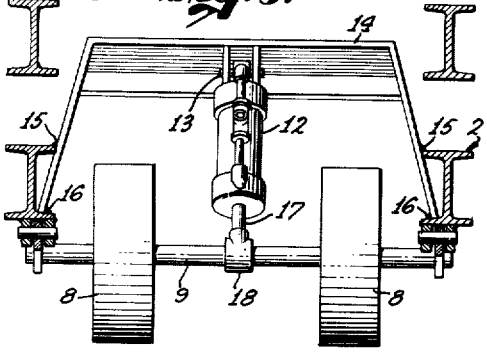
Figure 10:
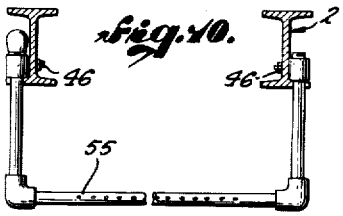

Referring in detail to the drawings, the bump cutter 1 is a self-propelled vehicle having a frame *means* which *includes a vehicle or main frame 2 and an extension frame 61. The frame 2* may have sections of channel iron welded together. The front of the frame 2 has fixed thereto bearings 3 and 4, see FIG. 7, for a cutter shaft 5, having *thereon a rotary cutter means comprising* a series of closely spaced circular saws indicated at 50. As shown in FIG. 2, the direction of rotation of the cutters 50 is counterclockwise as the machine moves ahead to the right. These cutters have a lineal speed such as 120 m.p.h. A torque converter operation of the machine is obtained so that its speed will depend on the amount of cutting being done, automatically progressing at a slow speed for a deep cut while automatically progressing at a faster speed for a shallower cut. Thus the cutting is accomplished at constant torque. This is accomplished by adjusting the drive to the maximum torque required, with the tractive effort in a direction opposed to the resistance offered by the action of the rotating saws on the pavement. The *rear end of the frame means is supported by a rear wheel means comprising* rear wheels 6 [are likewise] carried by an axle like 7 which is fixed to the frame 2, as by welding, while the front wheels 8 are fixed to an axle 9, see FIGS. 6 and 9, axle 9 being carried at each of its opposite ends by an arm like 10 which is pivoted as shown at 11 in FIG. 6 to the frame 2. The hydraulic cylinder 12 is operated to raise and lower the front wheels 8, this cylinder having a hinge connection 13 with a bracket 14, see FIG. 9, welded to the frame 2 as indicated at 15 and 16. The cylinder 12 has a piston rod 17 having a hinge connection 18 with the axle 9.

The oil pressure for operating cylinder 12 is obtained by a hand pump having an operating handle 21, and the pressure is released by operating the valve 22, to lower frame 2 with respect to the front wheels 8.

Figure 7:
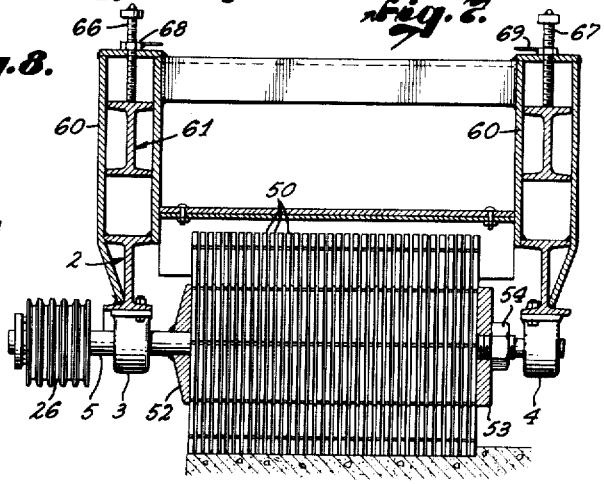
FIGS. 7, 9 and 10 are sectional views on lines of the corresponding numbers in FIG. 6 looking in the direction of the arrows.

Suitably mounted on the frame 2 is a gasoline engine 23 which as shown in FIG. 2, and others, has a pulley 24 having a series of V belts indicated at 25 for driving the pulley 26, see FIG. 7, on the cutter shaft 5. The engine pulley 24 also drives a belt indicated at 27, to drive pulley 28, see FIG. 4, which operates the oil pump 29. Belt 27 has an idler pulley 30, see FIG. 2, arranged on a standard 20 on the frame 2. The oil pressure produced by pump 29 is by-passed or controlled by valve 31 and is used to operate the hydraulic motor 32 connected through gears 33 to friction wheels 34 and 35 movable into or out of driving relation with each of the two rear wheels indicated at 6. Valve 31 is set to supply the maximum torque required for the job. The hydraulic motor 32, gears 33 and friction wheels 34, 35 are mounted on a tilt platform 36 having a hinge connection indicated at 37 with the frame 2, this platform being raised by spring 43 when handle 38 is in a forward position and lowered by a handle 38 against the action of spring 43.

Handle 38 is hinged at 39 in a bracket 40 and connected to an adjustable link 41 with the outer end of platform 36 as indicated at 42. When handle 38 is in the position shown in FIG. 3 it forces drive wheels 34, 35 into engagement with wheels 6, being a little beyond dead center against stop lug 48.

Fuel is supplied to the engine 23 from the gas tank 44 carried by the upright extension 45 on the platform 2.

Figure 8:
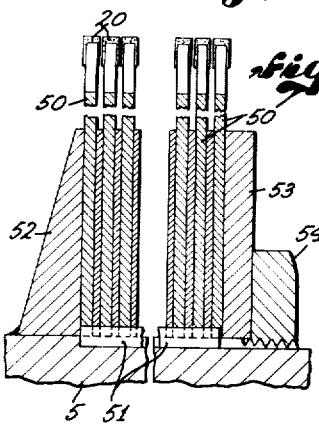
FIG. 8 is an enlarged sectional view with parts broken away of the cutters.

The shaft 5, as shown in FIG. 8, has a series of cutters as indicated at 50, which may be circular steel saws having diamond dust compound welded at their edges. The body of these saws may be .095 inch thick separated by spacers .060 inch thick held a shaft 5 by a key 51 having an end plate 52 and a washer 53 held in place by a nut 54. Each saw has an abrasive segment indicated at 20, each segment being .130 inch wide in an axial direction. The length of the series of cutters indicated at 50 is greater than the axial length of the front and rear wheels, whereby the machine cuts its own level path. As shown in FIG. 11, these cutters produce ridges indicated at 71, 72, the ridges having height of 1/16 to 1/32 inch, and being .025 inch wide, depending on the spacing of the saws and with a distance of .130 inch between adjoining redges depending on the width of the cutting segments indicated a 20 in FIG. 8. The width of ridges 71 and 72 is thus materially less than the width of the grooves formed by cutting segments, the ridge width being a small fraction of the groove width, as shown in FIG. 11.

The saw blades are cooled and the cuttings removed by a spray of water from an elongated nozzle 55 suitably mounted on frame as indicated at 46 and having a hose 47 and valve 56 connected to a suitable supply of water, on a separate tank vehicle or the like.

In order to reduce the effect of minor bumps, in between the 20 foot separation of the ridges referred to above, the front end of the frame 2 has an upright bracket 60 which is U-shaped and which overlies the horizontally extending removable extension frame 61. Frame 61 is U-shaped and has a removable hinge connection indicated at 62 on a horizontal axis with upright posts 63 on the frame 2, while the front end of extension frame 61 has a caster wheel 64 *which constitutes a front wheel means of the bumper cutter 1 and* which is spaced about four times as far, such as 10 feet, in front of the cutters 50 as the distance between the front and rear wheels 8 and 6. The posts 63 are mounted on frame 2 at a rear portion of the frame, between the front and rear wheels 8 and 6, but closer to the rear wheels 6 than the front wheels 8, the extension frame 61 having a hinge connection 62 with the top of the post 63 as shown in FIG. 2. Bracket 60 is mounted on the front end of frame 2, the weight of the cutters 50 and associated parts being shifted from the front wheels 8 to the caster wheel 64, the bracket 60 being then carried by an intermediate portion of the extension frame 61, when the front wheels 8 are in elevated position. The cutter thus partakes of less vertical movement than the caster wheel 64 which reduces the sensitivity of the cutter to the minor irregularities encountered by caster wheel 64. The handle 21 is operated to lower the front wheels 8 and raise the cutters 50 and the adjustable stop screws 66 and 67, see FIG. 7, are adjusted to limit the downward travel of the cutters 50 when the valve 22 is operated to release the pressure in the cylinder 12, whereby the front wheels 8 are elevated above the paving, the cutters 50 being supported by the rear wheels 6 and the caster wheel 64 at whatever height is chosen by adjusting the stop screws 66 and 67. These screws are locked in an adjusted position by lock nuts 68 and 69 as shown in FIG. 7. In this way, up and down movement of cutters 50 due to bumps encountered by caster 64, with the dimensions assumed above is only about 1/4 what it would be if the cutters 50 were supported by the front and rear wheels 8 and 6, the reduction being in proportion to the ratio of the lever arms involved.

Instead of using separate saw discs, a drum having cutters thereon may be employed, but preferably they are spaced as above described. Also, other types of abrasive wheels may be used.

The operator walks along behind the machine and maneuvers or steers it by means of the pair of handles like 70 fixed to the top of the frame extension 45. When the front wheels 8 are down they form a swivel point for turning the machine by the handles 70, the center of gravity of the machine being close to the front wheels 8. The balance is near enough to the front wheels 8 so that the operator can turn the machine.

The features of means to adjust the height of the cutter and the cutter with the propelling means are described and claimed in co-pending application Ser. No. 706,138, filed Dec. 30, 1957, for Concrete Bump Cutter *and now Patent No. 3,037,755.*

Various other modifications may be made in the invention without departing from the spirit of the following claims.

I claim:

1. A bump cutter comprising a vehicle having a main frame, said main frame having front and rear wheels, a cutter shaft carried by said main frame in front of said front wheels, in combination with an extension frame having a rear end having a hinge connection on a horizontal axis with said main frame, said extension frame having a front end having a wheel, said extension frame being U-shaped and extending horizontally, the front of said vehicle frame having an upright bracket overhanging said extension frame in position to rest on and be supported by said extension frame.

2. A bump cutter according to claim 1, said upright bracket being U-shaped and embracing said extension frame.

3. A rotary cutter adapted to form the cutting instrumentality of a vehicle type machine of the character heretofore described for cutting bumps on paving and comprising a drive shaft, a rectilinear series of similar, centrally apertured, comparatively thin, disc-like cutter members mounted concentrically on, and to rotate with, the drive shaft, spaced equidistantly apart, and each consisting of a comparatively thin circular body with flat parallel sides and, in addition, an annular cutting part which extends around the peripheral portion of, and is fixedly connected to, the body, contains diamond particles, is slightly wider than the body, and has its sides spaced equal distances outwards from the sides of the body, and a rectilinear series of similar annular spacers extending concentrically around the shaft, interposed between, and having the sides thereof in direct contact with, the sides of the bodies of the cutter members, having their outer diameter materially less than the outer diameter of said cutter members, and having their individual thickness such that they serve so to space apart the cutter members that the space between the opposed side faces of each adjoining pair of annular cutting parts is a small fractional part, of the width of each of said cutting parts, each of said cutting parts having a width of the order of .130 inch.

4. A bump cutter for pavement comprising a vehicle having a main frame, said main frame having front and rear wheels, a cutter shaft for a rotary cutter carried by said main frame in front of said front wheels, in combination with an extension frame having a rear end having a hinge connection on a horizontal axis with a rearward portion of said main frame, said extension frame having a front end having a wheel, the front of said vehicle frame having means extending into supporting relation with an intermediate portion of said extension frame for supporting the front of said vehicle frame and said cutter shaft on said intermediate portion of said extension frame when said front wheels are out of supporting relation with the pavement, and means for moving said front wheels out of supporting relation with the pavement to support said main frame by its said rear wheels and by an intermediate portion of said extension frame.

5. A bump cutter according to claim 4, said main frame having upright posts between said front and rear wheels and arranged closer to said rear wheels than said front wheels, the said hinge connection for the rear end of said extension frame being located in said posts.

6. A bump cutter according to claim 4 in combination with a rotary cutter on said cutter shaft, said rotary cutter comprising a series of similar cutting discs having cutting segments of the order of .130 inch wide and intervening spacers separating said discs an amount substantially narrower than the cutting segments of each cutter, said cutting segments having abrasive action which serves to level the ridges produced thereby to a height of 1/32 to 1/16 inch and the space between adjacent cutting segments being of the order of .020 to .025 inch.

7. A bump cutter comprising a vehicle having a main frame, said main frame having traction wheels, a cutter shaft carried by said main frame in front of said wheels, a rotary cutter on said cutter shaft, said rotary cutter comprising a series of similar cutting discs having cutting segments of the order of .130 inch wide and intervening spacers separating said discs on amount substantially narrower than the cutting segments of each cutter, said cutting segments having abrastive action which serves to level the ridges produced thereby to a height of 1/32 to 1/16 inch and the space between adjacent cutting segments being of the order of .020 to .025 inch.

8. A bump cutter according to claim 4, said intermediate portion of said extension frame being closer to said hinge connection than to said wheel for the front end of said extension frame.

9. In a concrete bump cutter of the character described, in combination, a two part composite vehicle frame structure including a rear frame section and a front frame section, means pivotally connecting the extreme rear end of said front frame section to the rear frame section at a point on the latter intermediate its ends for limited relative swinging movement between the frame sections about a horizontal axis, said front frame section in part overlying said rear frame section and overhanding the extreme front end of the latter, a rear traction wheel at the rear end of said rear frame section, a front traction wheel at the forward end of said front frame section, an abrasive cutter head rotatably mounted adjacent the forward end of said rear frame section and engageable with the traction surface beneath said frame structure, adjustable means movably mounted on one of said frame sections and engageable with the other frame section for limiting the extent of relative swinging movement between the frame sections in one direction, a front traction wheel mounted on said rear frame section in the forward regions thereof and said forward region of the rear frame section and its said front traction wheel being relatively movable toward and away from each other between an operative position of the rear frame front traction wheel wherein said forward end of the rear frame is elevated and said adjustable means is disengaged from said other frame section, and an inoperative position wherein said forward end of the rear frame is lowered and said adjustable means is engaged with said other frame sections, releasable means for positively forcing said rear frame front traction wheel and the forward end of said rear frame away from each other, a motor mounted on one of said frame sections, and means operatively connecting said motor and cutter head in driving relationship.

10. A bump cutter comprising a vehicle having a main frame, said main frame having front and rear wheels, a cutter shaft carried by said main frame in front of said front wheels, circular cutting means on said cutter shaft in combination with an extension frame having a rear end having a hinge connection on a horizontal axis with said main frame *rearwardly of said cutting means*, said extension frame having a front end having a wheel, the front *end* of said [vehicle] *main* frame having means extending into supporting relation with an intermediate portion of said extension frame for supporting the front *end* of said [vehicle] *main* frame and said cutting means on said intermediate portion of said extension frame, in combination with a motor on said main frame, and a driving connection between said motor and said cutter shaft.

*11. A self-propelled, vehicle-type concrete, pavement-cutting apparatus, including:*

*(a) frame means having longitudinally spaced front and rear ends;*

*(b) rear wheel means connected to and supporting said frame means adjacent said rear end thereof and including traction wheel means;*

*(c) front wheel means connected to and supporting said frame means adjacent said front end thereof;*

*(d) abrasive rotary cutter means mounted on said frame means intermediate said front and rear wheel means, and rotatable about a generally horizontal axis extending transversely of said frame means, for cutting a relatively wide and level path in concrete pavement over which pavement said front and rear wheel means run;*

*(e) means on said frame means for driving said traction wheel means and said rotary cutter means;*

*(f) said rear wheel means being behind and in line with said rotary cutter means and the transverse width of said rotary cutter means exceeding that of said rear wheel means so that said rear wheel means runs on the relatively wide and level path cut by said rotary cutter means to minimize any tendency of said rear wheel means to move said rotary cutter means vertically;*

*(g) said rotary cutter means being spaced forwardly from said rear wheel means a first longitudinal distance and said front wheel means being spaced forwardly from said rotary cutter means a second longitudinal distance; and*

*(h) said second longitudinal distance being large as compared to said first longitudinal distance so that any tendency of a bump encountered by said front wheel means to move said rotary cutter means vertically is reduced in proportion to the ratio of said first longitudinal distance to said second longitudinal distance.*

*12. A self-propelled, vehicle-type, concrete-pavement-cutting apparatus, including:*

*(a) frame means including a main frame and an extension frame projecting forwardly of said main frame and connected at its rear end to said main frame for pivotal movement relative thereto about a generally horizontal axis extending transversely of said frame means;*

*(b) means interconnecting said main and extension frames for supporting the front end of said main frame;*

*(c) rear wheel means connected to and supporting said main frame adjacent the rear end thereof and including traction wheel means;*

*(d) front wheel means connected to and supporting said extension frame adjacent the front end thereof;*

*(e) abrasive rotary cutter means mounted on said main frame forwardly of said rear wheel means, and rotatable about a generally horizontal axis extending transversely of said main frame, for cutting a relatively wide and level path in concrete pavement over which pavement said front and rear wheel means run;*

*(f) means on said frame means for driving said traction wheel means and said rotary cutter means;*

*(g) said rear wheel means being behind and in line with said rotary cutter means and the transverse width of said rotary cutter means exceeding that of said rear wheel means so that said rear wheel means runs on the relatively wide and level path cut by said rotary cutter means to minimize any tendency of said rear wheel means to move said rotary cutter means vertically;*

*(h) said rotary cutter means being spaced forwardly from said rear wheel means a first longitudinal distance and said front wheel means being spaced forwardly from said rotary cutter means a second longitudinal distance; and*

*(i) said second longitudinal distance being large as compared to said first longitudinal distance so that any tendency of a bump encountered by said front wheel means to move said rotary cutter means vertically is reduced in proportion to the ratio of said first longitudinal distance to said second longitudinal distance.*

*13. A self-propelled, vehicle-type, pavement-cutting apparatus, including:*

*(a) frame means having longitudinally spaced front and rear ends;*

*(b) rear wheel means connected to and supporting said frame means adjacent said rear end thereof and including traction wheel means comprising two laterally spaced traction wheels on opposite sides of and equidistant from the longitudinal centerline of said frame means;*

*(c) front means connected to and supporting said frame means adjacent said front end thereof located substantially on said longitudinal centerline of said frame means;*

*(d) rotary cutter means mounted on said frame means intermediate said front and rear wheel means, and rotatable about a generally horizontal axis extending transversely of said frame means, for cutting a relatively wide and level path in pavement over which pavement said front and rear wheel means run;*

*(e) means on said frame means for driving said traction wheel means and said rotary cutter means;*

*(f) said rear wheel means being behind and in line with said rotary cutter means and the transverse width of said rotary cutter means exceeding that of said rear wheel means so that said rear wheel means runs on the relatively wide and level path cut by said rotary cutter means to minimize any tendency of said rear wheel means to move said rotary cutter means vertically;*

*(g) said rotary cutter means being spaced forwardly from said rear wheels means a first longitudinal distance and said front wheel means being spaced forwardly from said rotary cutter means a second longitudinal distance; and*

*(h) said second longitudinal distance being large as compared to said first longitudinal distance so that any tendency of a bump encountered by said front wheel means to move said rotary cutter means vertically is reduced in proportion to the ratio of said first longitudinal distance to said second longitudinal distance.*

References Cited by the Examiner

The following references, cited by the Examiner, are of record in the patented file of this patent or the original patent.

UNITED STATES PATENTS

| | | |
|---|---|---|
| 462,264 | 11/91 | Love. |
| 1,005,544 | 10/11 | Henderson. |
| 1,084,810 | 1/14 | Messer. |
| 2,244,742 | 6/41 | Tyson. |
| 2,634,962 | 4/53 | Eglitis. |
| 2,709,878 | 6/55 | Olson. |
| 2,736,544 | 2/56 | Wright. |
| 2,744,740 | 5/56 | Ball. |
| 2,777,680 | 1/57 | Robb. |

FOREIGN PATENTS

| | | |
|---|---|---|
| 379,446 | 3/40 | Italy. |

CHARLES E. O'CONNELL, *Primary Examiner.*

BENJAMIN HERSH, *Examiner.*